United States Patent [19]

Beale

[11] Patent Number: 5,396,870
[45] Date of Patent: Mar. 14, 1995

[54] FOOT PEDAL ASSEMBLY FOR CONTROL OF A VEHICLE ENGINE

[75] Inventor: Robert S. Beale, Portland, Oreg.

[73] Assignee: Williams Controls, Inc., Portland, Oreg.

[21] Appl. No.: 119,428

[22] Filed: Sep. 8, 1993

[51] Int. Cl.⁶ .................................... F02D 11/10
[52] U.S. Cl. ................................ 123/399; 74/513; 180/335
[58] Field of Search ............... 123/399; 74/513; 180/335

[56] References Cited

U.S. PATENT DOCUMENTS

| | | | |
|---|---|---|---|
| 4,915,075 | 4/1990 | Brown | 123/399 |
| 4,958,607 | 9/1990 | Lundberg | 123/399 |
| 5,241,936 | 9/1993 | Byler et al. | 123/399 |

*Primary Examiner*—Noah P. Kamen
*Attorney, Agent, or Firm*—Robert L. Harrington

[57] ABSTRACT

A coupling for coupling a foot pedal to a sensor used to control the throttle of a vehicle's engine. A shaft assembly is provided including a shaft having ends configured to interconnect the rotative movement of a pedal with the shaft of a potentiometer. The shaft is provided with bearings, a cross pin and the mounting for pedal return springs. A housing assembly is produced from a pair of identical castings that together provide the seats for the bearings, cross pin and springs mounted to the shaft. The housing halves split the housing lengthwise. With the halves separated, the shaft assembly is placed in the seats of the bottom half and the top half is assembled to the bottom half to complete the assembly. The seat for the cross pin provides the stops to prevent axial movement of the shaft and to provide restricted rotative movement of the shaft.

4 Claims, 3 Drawing Sheets

FOOT PEDAL ASSEMBLY FOR CONTROL OF A VEHICLE ENGINE

FIELD OF THE INVENTION

This invention relates to a coupling that couples a vehicle's foot pedal to a sensor, e.g., a potentiometer whereby the throttle of the vehicle's engine is electronically controlled.

BACKGROUND OF THE INVENTION

In recent years there has been a movement from direct cable connection as between a foot pedal and an engine throttle to an electronic connection. An example of such electronic system can be found in the commonly owned U.S. Pat. No. 5,133,321 which is incorporated herein by reference.

Typical components for such a system are a foot pedal, a sensor, and a coupling that couples the foot pedal to the sensor. The sensor senses foot pedal movement and position as between idle and full throttle, and then conveys an electronic signal to the engine's throttle control. The throttle control incorporates a monitor that monitors the signal from the sensor and converts the signal to the appropriate commands for setting the throttle speed.

The system particularly contemplated by this invention is used in trucks. Trucks are largely controlled by government and/or industry regulations and requires designated safety features. Certain of these features are commonly incorporated into the coupling between the foot pedal and the sensor.

The primary objective of the coupling is to couple the foot pedal to the sensor/potentiometer and this is accomplished by a shaft having one end attached to the foot pedal in a manner whereby depression of the foot pedal causes rotative turning of the coupling shaft about its axis. The other end is attached to the potentiometer shaft. Thus as the pedal is depressed the resulting rotation of the coupling shaft causes corresponding rotation of the potentiometer shaft.

It is desirable to control movement of the coupling shaft. The shaft should be prevented from any axial movement and it should be restricted in its rotative movement which in one extreme position represents the foot pedal fully retracted, i.e., nondepressed whereat the engine throttle should be at idle. The other extreme position represents the foot pedal at the full depression and the engine at full throttle. Rotative control is provided by "stops". Thus the shaft is provided with a protrusion. The shaft is encased in a housing. The housing is provided with attachments strategically positioned in the path of the shaft protrusion as the shaft is rotated. Thus the protrusion engages one stop positioned at the extreme rotative position representing idle and a second stop positioned at the opposite extreme rotative position representing full throttle.

Whereas a vehicle foot pedal is manually depressed (by the operator's foot) the return to idle is provided by a spring return. Prescribed safety standards provide for a double spring return. This spring return is preferably incorporated into the coupling. Thus the coupling has become a complex assortment of components starting with the housing and shaft and including numerous bearings, springs, pins, etc. The production of the parts is expensive and the assembly cost adds substantial additional cost.

It is therefore an object of the present invention to provide a fully operable and reliable coupling for vehicle engine control that has reduced parts, less complexity and easier assembly.

SUMMARY OF THE INVENTION

This invention is an adaptation of a commonly owned invention disclosed in U.S. Ser. No. 08/119,420 and filed concurrently herewith. In that invention it was determined that the coupling could be characterized as two basics subassemblies referred to as the shaft assembly and the housing assembly. A single die cast aluminum housing having a through bore is provided in the die cast process with a rotative path for the shaft protrusion including the stops to limit rotation of the shaft. A bushing for the shaft was added. A shaft assembly mounted in the housing includes a cross pin that engages the stops to limit both rotative movement and axial movement in one direction. A retainer ring secures the shaft assembly to the housing and limits axial movement in the opposite direction. The result is a far simpler coupling to produce and assemble and the disclosure of the above application is incorporated herein by reference.

The invention of the above application is not directly applicable to a coupling for a vehicle engine as the single die casting does not readily adapt to the inclusion of the return springs. It does suggest a solution for simplifying the production and assembly. In brief, the housing of the present invention is provided by a pair of identical housing halves. When mated and fastened together they provide a housing having the stops and seatings required for the shaft protrusion bushings and springs. A shaft assembly includes a cross pin that provides the shaft protrusion and springs and bushings. Assembly is easily accomplished by placing the shaft assembly into one half of the housing with the shaft components appropriately nested in the castin seatings, and then the identical second half is secured to the first half.

The separate components are minimized and the assembly is simplified. The features and benefits will be more clearly appreciated upon reference to the following detailed description and drawings referred to therein.

DETAILED DESCRIPTION OF THE DRAWINGS

Figure 1:
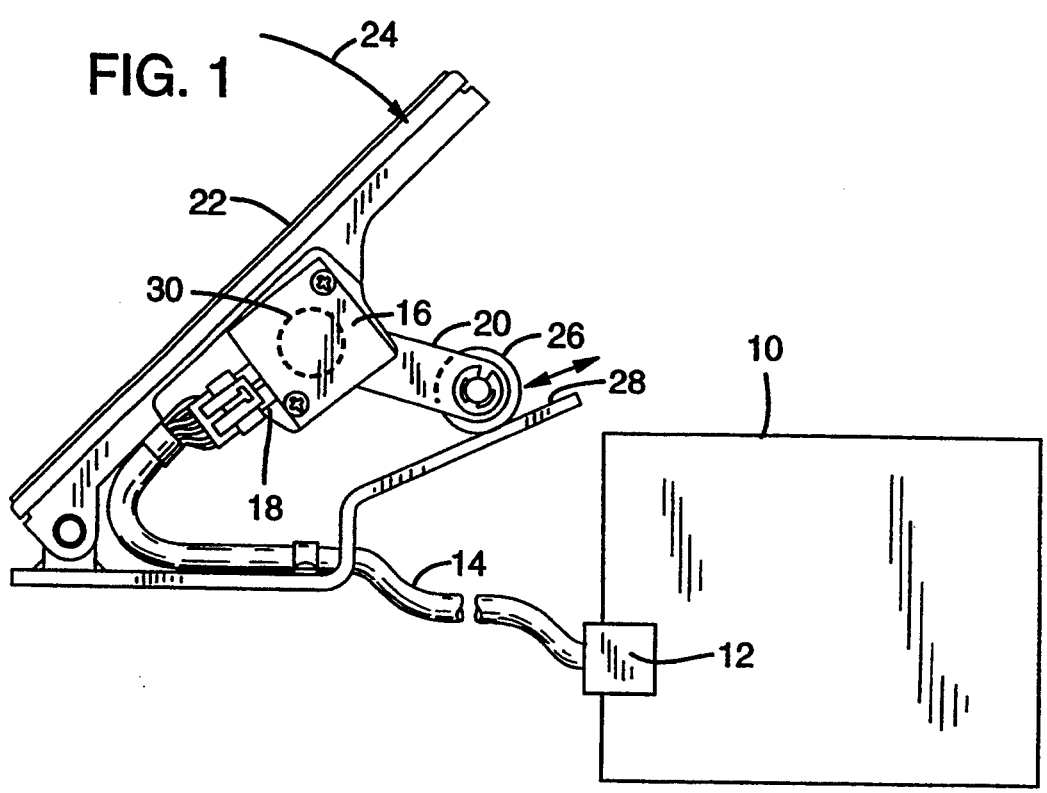
FIG. 1 is a schematic view in perspective of an engine of a vehicle connected to a sensor, the sensor being coupled to the vehicle's foot pedal with a coupling in accordance with the present invention.

With reference to FIG. 1, illustrated is a vehicle engine 10 including a monitor 12 that receives electronic signals from conductors 14 and converts those signals to throttle control settings. The concept is known and no further explanation will be provided.

The electronic signals are received from a sensor 16 preferably including a potentiometer having its shaft coupled by coupling 18 to a lever 20. The coupling and lever are attached to a foot pedal 22 which is manually depressed as indicated by arrow 24 to force the lever and roller 26 along ramp 28. As the lever is folded under the collapsing foot pedal, the shaft 30 of the coupling 18 rotates, causing rotation of the potentiometer shaft which varies the output signal through conductors 14. A spring housed in the coupling 18 forces return movement of the foot pedal and return movement of the lever end 26. Thus an operator presses the foot pedal down to rotate shaft 30 counter clockwise as illustrated in FIG. 1 and upon release by the operator's foot pressure, the springs force return of the pedal to rotate shaft 30 clockwise. Rotation of the shaft 30 thus is proportional to the movement of the foot pedal 22 and that movement is the movement monitored by monitor 12 for generating the proportionate throttle setting. The illustrated foot pedal is but one example and numerous variations in foot pedal types are applicable. The manner of connecting the foot pedal movement to the coupling shaft can also vary and includes an interconnecting linkage that is not illustrated in the drawings.

Figure 2:
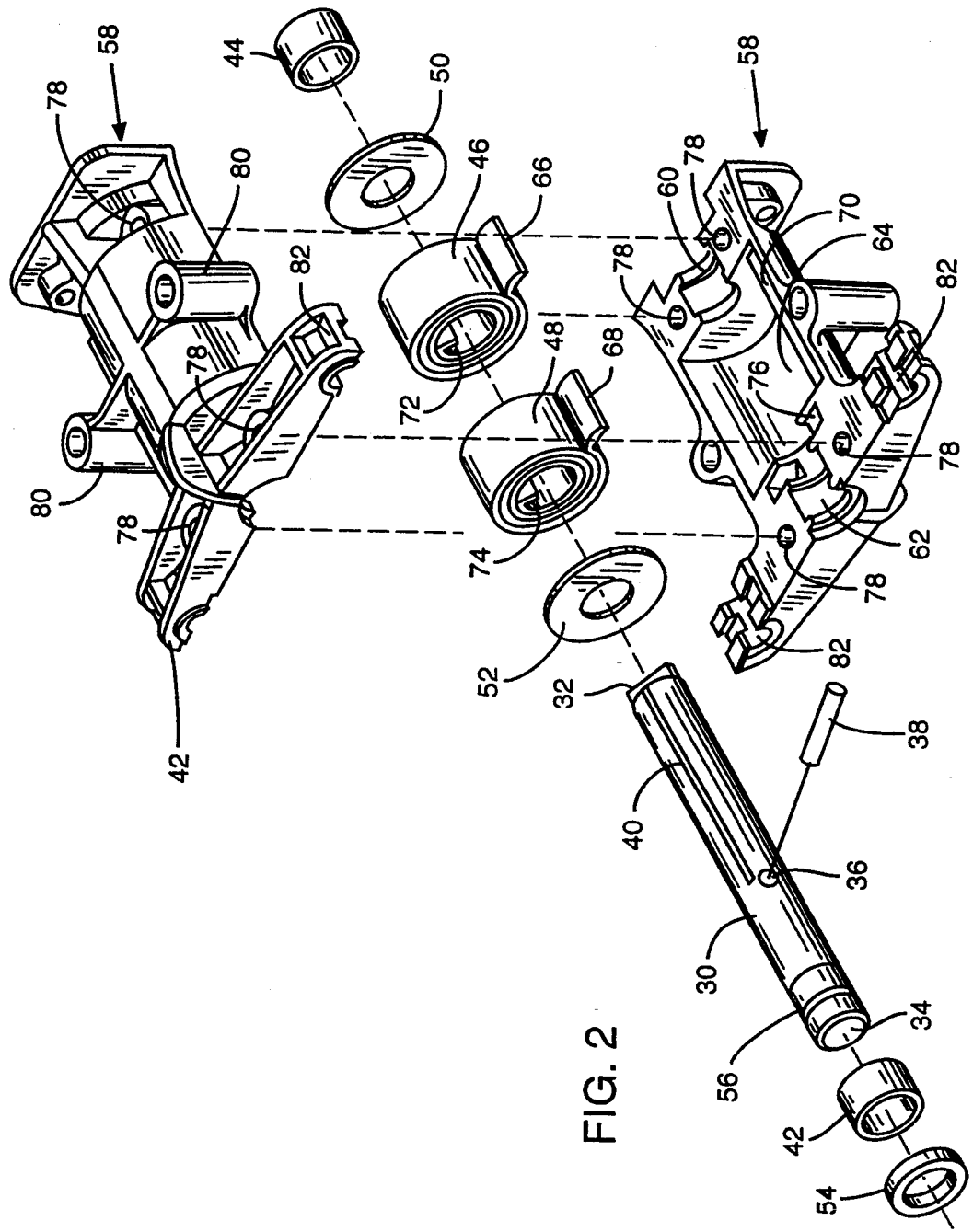
FIG. 2 is an exploded view of the coupling of FIG. 1 illustrating the die cast housing halves and the components of the shaft assembly.
Figure 4:
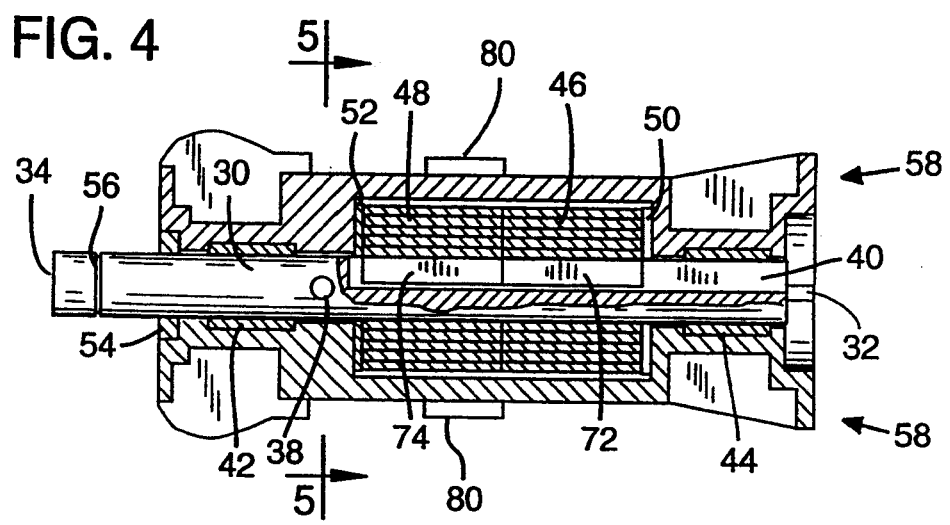
FIG. 4 is a view taken on view lines 4—4 of FIG. 3.

Reference is now made to FIG. 2 wherein the coupling 18 is illustrated in exploded view. Reference is also made to FIG. 4 wherein the components are shown assembled. The housing assembly is considered to be comprised of two subassemblies, i.e, the shaft assembly and the housing assembly. Reference is first made to the shaft assembly.

The shaft 30 is configured at one end 32 to mate and interconnect to the shaft of the potentiometer. The opposite end 34 is configured to receive, e.g., a lever 20 and as will be noted from FIG. 4 as illustrated, is nothing more than a stub shaft that can be inserted into an open end in the end of a lever 20 and clamped to the lever, e.g., by a set screw. A hole 36 is strategically placed through the shaft to receive therein a pin 38. A longitudinal slot 40 is provided to receive the spring tangs as will be explained. Bushings 42, 44 are provided at each end to permit free turning of the shaft and intermediate the bushings are double clock springs 46, 48 located between washers 50, 52. A shaft seal 54 is positioned in on the end 34 of the shaft to seal out dirt and dust in the fully assembled coupling as seen in FIG. 4.

Referring to the housing assembly, the housing is entirely constructed of two identical housing halves 58 that are produced from die cast aluminum. The components of the housing halves 58 that interact with the shaft assembly are cast into the housing halves. The bushings 42, 44 of the shaft assembly nest in seats 60, 62. It will be understood that the upper housing half 58 (as shown in FIG. 2) includes all of the features of the lower half. For example, a seat 60 of the upper half cooperates with seat 60 of the lower housing half to capture bushing 44. This is true of all the various seats and the reader must simply consider that the lower housing half is inverted over onto itself.

The center cavity 64 captures the double springs 46, 48 and the washers 50, 56. Outer tangs 66, 68 of the clock springs 46, 48 are captured in a groove that is formed by step 70 of the lower half when the two halves 58 are clamped together. The inner tangs 72, 74 are inserted in slot 40 of the shaft prior to assembly of the housing halves and assembly of the halves forces a limited winding of the springs to pretension the springs to insure full rotation of the shaft to the idle position.

Turning of the shaft clockwise relative to the housing increases wind up of the springs to urge a positive return-to-idle force when the manual movement of the pedal is released.

Figure 5:
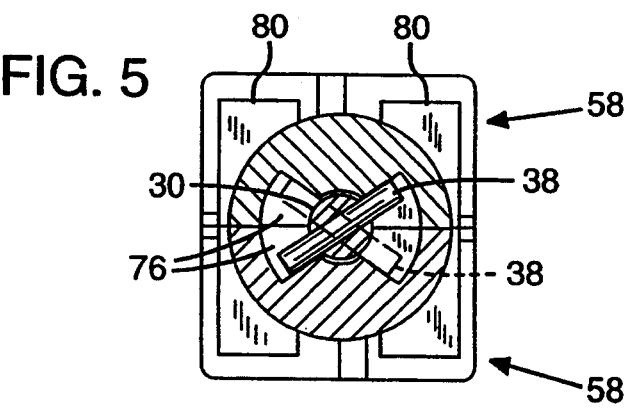
FIG. 5 is a section view as if taken on view lines 5—5 of FIG. 4.

Most important is the formed seat 76 which receives the pin 38 of the shaft 30. The reader is referred to FIG. 5 for a full appreciation of the seat 76. As illustrated the seat is formed to limit rotation of pin 38 within the seat 76. The bottoms of the seat 76 provide stops against which pins 38 abut when reaching their rotative limit. It will also be noted that the seats 76 prevent axial movement of the pin 38 and thus the shaft. The cooperative action of the pin 31 and seat 76 prevents axial movement and restricts rotative movement of the shaft assembly.

Figure 3:
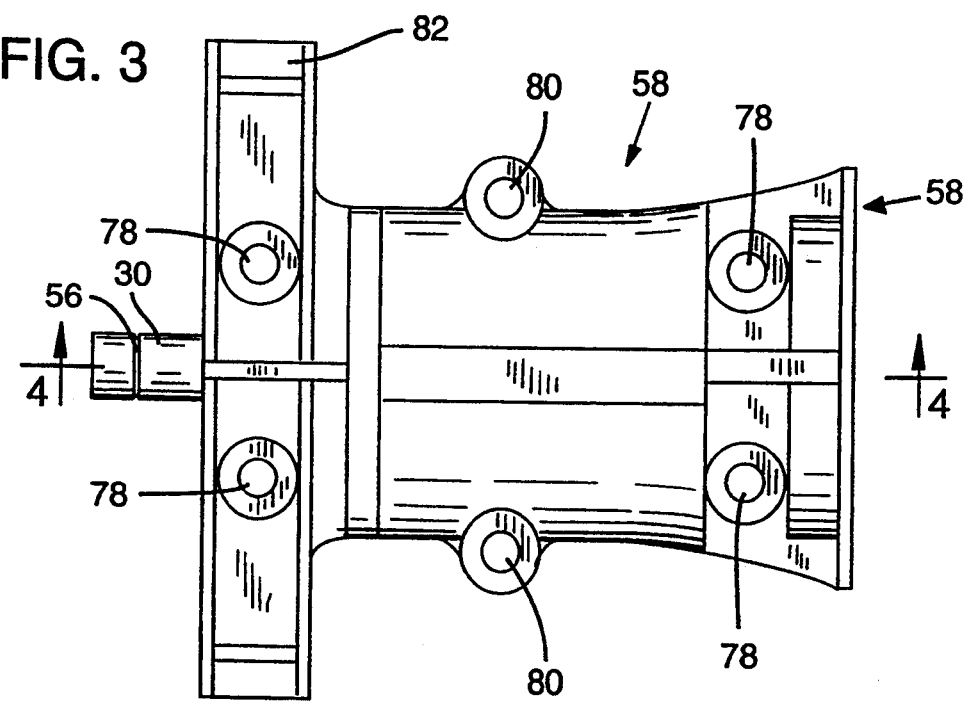
FIG. 3 is a top view of the coupling of FIG. 2.

The remainder of the housing assembly is self explanatory. Holes 78 become appropriately aligned to receive clamping screws or bolts that securely clamp the two halves together. When clamped together, as shown in the illustrated embodiment, mounting lugs 80 and 82 are provided to accommodate the different mounting locations provided in different types of vehicles. The mounting lugs and their relation to the coupling and sensor 16 are illustrated in the plan view of FIG. 3.

From the above it will be appreciated that the two subassemblies are produced from a minimum of parts. The shaft assembly is fully assembled to include the bearings, washers, springs, and pin 38 prior to placement of the shaft assembly in the housing assembly. The housing assembly is produced from a single casting and includes nothing more than what is cast into its configuration. The shaft assembly is simply placed in the lower housing half with the shaft assembly components appropriately seated in their designated seats and the upper half is placed onto the lower half to align the holes 78 and finally the screws or bolts are inserted (see FIG. 3).

A major factor in providing the simplicity of construction lies in the concept of a die cast housing wherein the housing is split lengthwise into identical upper and lower halves. Whereas the above described coupling is considered the preferred embodiment there are numerous alternative embodiments possible without departing from the inventive concept. The scope of the invention is not limited to the illustrated embodiment but instead is encompassed by the claim definitions appended hereto.

I claim:

1. In an electronic remote control for controlling the throttle speed of a vehicle's engine, a foot pedal, a sensor for sensing the foot pedal movement, and a coupling between the foot pedal and sensor, said coupling comprising;

a shaft assembly and a housing for housing the shaft assembly, said shaft assembly including a shaft having an axis and opposed ends, one end connected to a foot pedal whereby manual movement of the foot pedal rotates the shaft about its axis and away from an initial rotative position relative to the housing, the other end of the shaft connected to a sensor to transmit the foot pedal movement to the sensor, and springs mounted on the shaft to resist rotation of the shaft and to return the shaft to its initial rotative position relative to the housing, and bearings mounted on the shaft to permit free rotation of the shaft relative to the housing, and a protrusion on the shaft lateral to the shaft axis that pivots around the axis of the shaft upon rotation of the shaft; and said housing being split lengthwise and comprised of upper and lower mated halves, said mated halves being die cast to provide configured seats that cooperatively receive the components of the shaft assembly, the seat for the protrusion providing stops for preventing axial movement of the shaft assembly relative to the housing and restricting the rotative movement thereof.

2. A coupling as defined in claim 1 wherein the housing halves are identical.

3. A coupling as defined in claim 2 wherein the return springs are clock springs having an inner tang end and an outer tang end, a groove provided in the shaft to receive the inner tang end, and a step formed in the housing half at the juncture between the halves to receive the outer tang end and the relative configuration of the spring and housing forcing a pretension of the spring upon assembly.

4. A coupling as defined in claim 2 wherein the die cast halves are provided with mounting lugs for mounting the assembled coupling in a fixed relation relative to the foot pedal.

* * * * *